United States Patent [19]

Ban et al.

[11] 4,315,177

[45] Feb. 9, 1982

[54] DIRECT CURRENT MOTOR WITH NON-SUPERPOSED ARMATURE WINDINGS

[76] Inventors: Itsuki Ban, 829, Higashi-Oizumimachi, Nerima-ku, Tokyo; Manabu Shiraki, 4451-171, Shimotsuruma, Yamato-shi, Kanagawa-ken; Kazuhito Egami, 2-44-1, Chuo, Nakano-ku, Tokyo, all of Japan

[21] Appl. No.: 146,753

[22] Filed: May 5, 1980

Related U.S. Application Data

[63] Continuation of Ser. No. 952,143, Oct. 17, 1978, abandoned.

[30] Foreign Application Priority Data

Jan. 23, 1978 [JP] Japan .................................... 53-5318

[51] Int. Cl.$^3$ ............................................ H02K 21/26
[52] U.S. Cl. .................................... 310/154; 310/198; 310/268
[58] Field of Search ............................ 310/154, 198–208, 310/180, 268

[56] References Cited

U.S. PATENT DOCUMENTS

| | | | |
|---|---|---|---|
| 3,239,705 | 3/1966 | Kavanaugh | 310/268 |
| 3,348,086 | 10/1967 | Monma | 310/268 |
| 3,737,697 | 6/1973 | Kitamori et al. | 310/268 X |
| 3,796,899 | 3/1974 | Giachello | 310/268 X |

*Primary Examiner*—Donovan F. Duggan
*Attorney, Agent, or Firm*—Kenway & Jenney

[57] ABSTRACT

A direct current motor is provided with a field magnet having $l(2m+2n)$ alternating N and S poles (l and m being positive integers of one or more and n being a positive integer of two or more) that are magnetized within segments of equiangular width about the field magnet, a magnetic-material member for closing the magnetic path of the field magnet, and an armature having $2ln$ armature windings distributed thereon in a non-superposed manner with respect to each other and in a face-to-face relationship with respect to the field magnet poles, each winding having an angular spacing between those conductor portions thereof that contribute to the generation of the torque that is equal to the angular width of a field magnet pole.

2 Claims, 9 Drawing Figures

DIRECT CURRENT MOTOR WITH NON-SUPERPOSED ARMATURE WINDINGS

This is a continuation of application Ser. No. 952,143, filed Oct. 17, 1978, now abandoned.

BACKGROUND OF THE INVENTION

This invention relates to a direct current (DC) motor which has, for (2m+2n) field magnet poles (2m+2n), (where m is a positive integer of 1 of more and n is a positive integer of 2 or more), 2n armature windings which are disposed, or a disk-shaped or cylindrical armature in a non-superposed manner with respect to each other or in a single layer.

In conventional DC motors having a plurality of armature windings, the armature windings disposed on the armature in such a manner that the windings are superposed on each other in multiple layers. In the manufacture of such DC motors, substantial labor is required for processing the edge portions of the superposed armature windings, this labor requirement impeding the convenient mass production of the motors. If a plurality of armature windings are resin molded and solidified into a unit for disposition on an armature, the resultant armature assembly have an increased thickness because the armature windings are superposed on each other in multiple layers. This increased thickness of the armature will substantially reduce the effective magnetic field which passes through the armature, thus resulting in decreases in motor efficiency and starting torque.

SUMMARY OF THE INVENTION

The above-described drawbacks in the prior art have been successfully eliminated by the present invention.

Accordingly, an object of the invention is to provide a DC motor which requires fewer armature windings and accordingly is especially suited for mass production, and is low in cost.

Another object of the invention is to provide a DC motor in which the effective length of those conductor portions of the armature windings that contribute to the generation of torque is sufficiently large as compared with the length of the other portions, which contribute to the copper loss, that the efficiency of the motor is increased.

According to the invention, a DC motor is provided with a field magnet having l(2m+2n) poles (l and m being each a positive integer of 1 or more and n being a positive integer of 2 or more) which are magnetized respectively into alternate N- and S-polarities in equal angular spaces, a magnetic-material member for closing the magnetic path of the field magnet, 2ln armature windings disposed on an armature each winding having, between those conductor portions thereof that contribute to the generation of torque, an angular spacing which is equal to the angular width of the field magnet pole, the armature windings disposed thereon and within the magnetic path in a non-superposed fashion with respect to each other i.e., in a single layer, and in a face-to-face relationship with respect to the field magnet, and a rotatable shaft for supporting either the armature or the field magnet for rotation, the shaft supported by bearings provided in the motor housing.

These and other objects, features and advantages of the invention will become apparent from the following description of the preferred embodiments thereof taken in conjunction with the accompanying drawings.

BRIEF DESCRIPTION OF THE DRAWINGS

FIG. 1b is a plan view diagrammatically illustrating the field magnet in the motor of FIG. 1a;

FIG. 1c is a plan view illustrating the armature in the motor of FIG. 1a;

DETAILED DESCRIPTION OF THE PREFERRED EMBODIMENTS

Figure 1A:
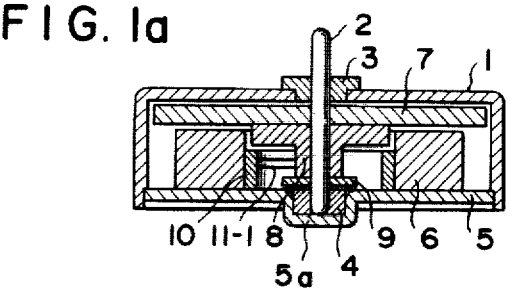
FIG. 1a is a cross sectional view schematically illustrating the construction of a DC motor of the present invention.
Figure 1B:
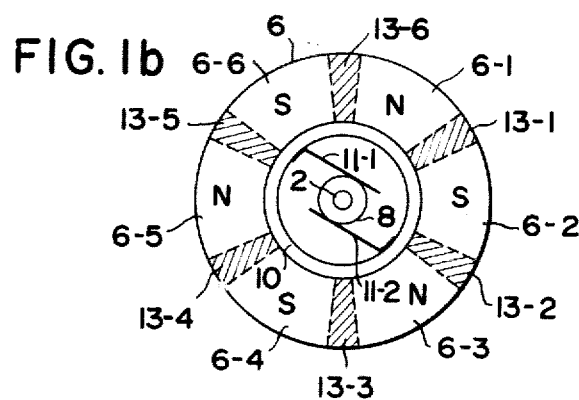
Figure 1C:
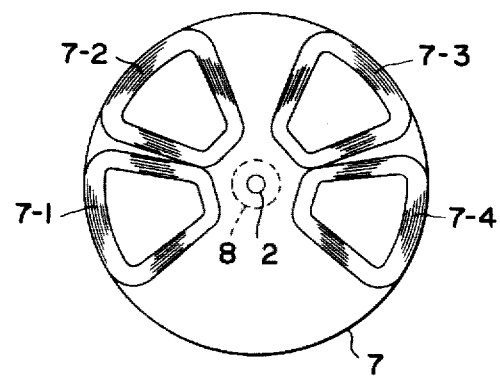

FIGS. 1a, 1b, and 1c illustrate the construction of a DC commutator motor according to the present invention which is provided with a disk-shaped armature. As shown in FIG. 1a, a disk-shaped soft steel plate 5 having a circular depression 5a formed in a central portion thereof is force fitted into the bottom portion of a cylindrical housing 1, which is made by press forming a soft steel plate. The housing 1 with the plate 5 are adapted to form and close a magnetic path. Bearings 3 and 4 are provided, respectively, in the top wall of the housing 1 and the circular depression 5a formed in the bottom plate 5. The bearings 3 and 4 support a rotatable shaft 2 with an end thereof abutting and pressing against the inner surface of the circular depression 5a. An annular field magnet 6 is coaxially secured to the inner surface of the disk-shaped soft steel plate 5. An armature 7 and an integrally formed commutator 8 is secured to the shaft 2. A washer 9, which functions as an oil shield, is attached to the shaft 2 under the commutator 8. The armature 7 is so placed that it is within the magnetic field in the air gap between the housing 1 and the field magnet 6. The field magnet 6 comprises, as shown in FIG. 1b, magnetic poles 6-1, 6-2, . . . , 6-6 which are magnetized into alternate N- and S-polarities and subtend angular spacings of about 48° and are spaced alternately with sections 13-1, 13-2, . . . , 13-6 which subtend an angular spacing of about 12° each and contain either a weak magnetic field or no magnetic field. A cylindrical plastic molded member 10 is fitted into the central opening of the annular field magnet 6. Brushes 11-1 and 11-2 have their base portions fixed to the inner face of the cylinder 10 and their free end portions maintained in sliding contact with the commutator 8. The armature 7 comprises, as shown in FIG. 1c, sectorial armature windings 7-1, 7-2, 7-3, 7-4 which are arranged in a non-superposed fashion with respect to each other and are embedded in a plastic disk of the armature. The angular spacing between those conductor portions, of each sectional armature winding that contribute to the generation of torque, is about 48° which is equal to the angular width or space of each of the field magnet poles 6-1, 6-2, . . . , 6-6. While, in the illustrated embodiment, the angular space of the field magnet pole and the angular spacing between those conductor portions of the armature winding that contribute to the generation of torque has been described to be about 48°, it is apparent that, should an armature winding be desired having a larger angular width or space than that in the illustrated embodiment, the angular spacing between those conductor portions of the armature winding that contribute to the generation of torque needs to be made less than 48° to avoid superposition of adjacent portions of the armature windings, which have such larger angular widths, with respect to each other because the armature windings are to be arranged at predetermined angular spaces and the angular width of the field magnet pole needs to be equal to such less angular spacing between the conductor portions of the armature winding. This will be true in other embodiments to be described hereinafter. With the above-described configuration of the armature windings the radial length of the conductor portions of the armature windings which contribute to the generation of torque can be made small as compared with the length of the outer and inner peripheries, which contributes to the copper loss, thus resulting in an increased efficiency. This armature winding configuration is also desirable for increasing the efficiency of motors in which the armature windings are applied to a cylindrical armature (not shown). The above-described arrangement of armature windings provides an armature 7 that does not have an increased thickness because the armature windings according to the invention are juxtaposed with respect to each other in a non-superposed fashion or in a single plane. This non-superposed distribution is to be contrasted with motors having conventional lap windings in which the windings are superposed. Accordingly, the distance between the field magnet 6 and the housing 1 (FIG. 1a) can be made relatively small, allowing the magnetic field to have an increased strength, resulting in increases in efficiency and torque. With the four sectorial armature windings juxtaposed with respect to each other and embedded in the plastic plate, the armature 7 is simple to manufacture and especially suited to mass production.

Figure 2:
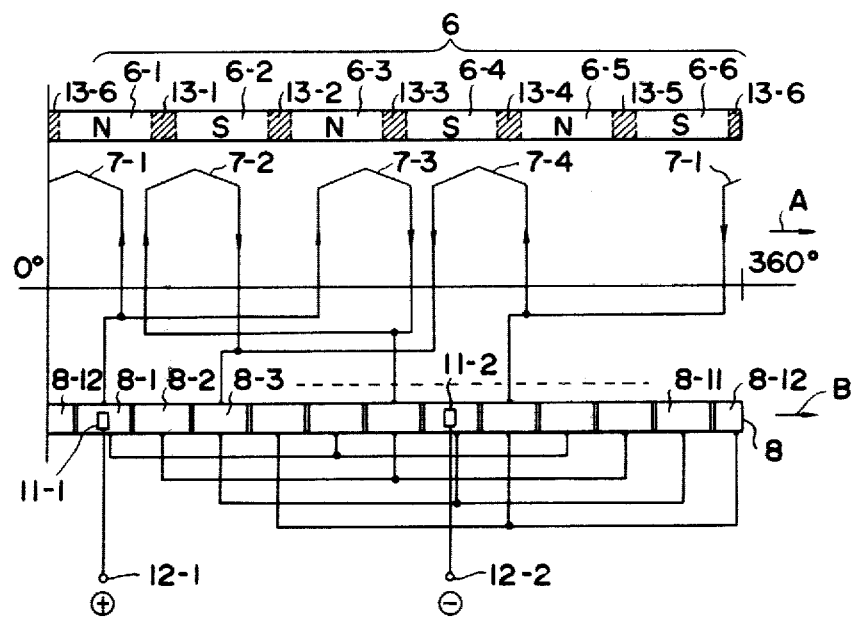
FIG. 2 is a developed view of the field magnet and the armature shown in FIG. 1.

The principle of rotation of the armature is described below in connection with the development of FIG. 2c in which the armature windings are connected in a ring fashion. The commutator 8 comprises commutator segments 8-1, 8-2, . . . , 8-12, each subtending an angular space of 30°. The commutator segments 8-1, 8-5, and 8-9 are interconnected in common though a lead wire, and similarly, the commutator segments 8-2, 8-6, and 8-10; the segments 8-3, 8-7, and 8-11; and the segments 8-4, 8-8, and 8-12 are interconnected in common through corresponding lead wires, respectively. The armature windings 7-1, 7-2, 7-3, and 7-4 are arranged in the manner shown in FIG. 2 as follows: the armature windings 7-1 and 7-2, and the windings 7-3 and 7-4 are disposed at a 60° angular spacing, respectively; the windings 7-2 and 7-3 at a 90° angular spacing; and the windings 7-4 and 7-1 at a 150° angular spacing; all of the armature windings being arranged in a non-superposed fashion with respect to each other. The respective junctions between the armature windings 7-1 and 7-3, between the windings 7-3 and 7-2, between the windings 7-2 and 7-4, and between the windings 7-4 and 7-1 are connected respectively to the commutator segments 8-1, 8-6, 8-3, and 8-8. The brushes 11-1 and 11-2 are electrically connected respectively to positive and negative terminals 12-1 and 12-2 of a DC supply source. In the illustrated embodiment, the brushes 11-1 and 11-2 are located with an angular spacing of 180° therebetween, while any other spacing value of space of 60° (360°/l(2m + 2n)) where l and m are each a positive integer of 1 or more and n is a positive integer of 2 or more, and, in this case, l=1, m=1, n=2) or 300° may be employed as an equivalent, in principle, of the value of 180°. In the state shown in FIG. 2, current flows in the directions indicated by the arrows, i.e., flows in parallel through the armature windings 7-1, 7-4, and through the windings 7-3, 7-2 to generate torque at the respective windings, to drive the armature 7 in the direction of arrow A and cause the commutator 9 to rotate in the direction of arrow B. Upon rotation through 30°, the state of current flow changes to parallel flows through the armature windings 7-1, 7-3 and through the windings 7-4, 7-2, with torque being generated at the respective windings. Upon a further 30° rotation, the state of current flow again changes to parallel flows through the armature windings 7-2, 7-3 and through the windings 7-4, 7-1, with torque being generated at the respective windings. As can be appreciated, torque is generated in sequence at the respective armature windings to continuously drive the armature and the commutator.

While the above-described embodiment illustrates a commutator-type motor having a disk-shaped armature, the invention can be applied also to a motor having a cylindrical armature and to a commutator-less motor. In the invention, for (2m + 2n) (where m is a positive integer of 1 or more and n is a positive integer of 2 or more) field magnet poles, 2n of armature windings are employed, and each armature winding is formed to have an angular spacing between those conductor portions thereof that contribute to the generation of torque, that is equal to the angular width of the field magnet pole. In the illustrated embodiment, m has been selected as equal to 1 and n is equal to 2. Other embodiments will be described hereinbelow in connection with FIG. 3 and the succeeding figures which illustrate developments of other examples of armatures and field magnets. Although motors described below have armature windings that are connected in a ring fashion, it will be apparent to those skilled in the art that the invention can be applied to motors in which one end of each of the armature windings is connected in common, and, as described above, to a commutatorless motor wherein current is supplied to armature windings by means of semiconductor devices.

Figure 3:
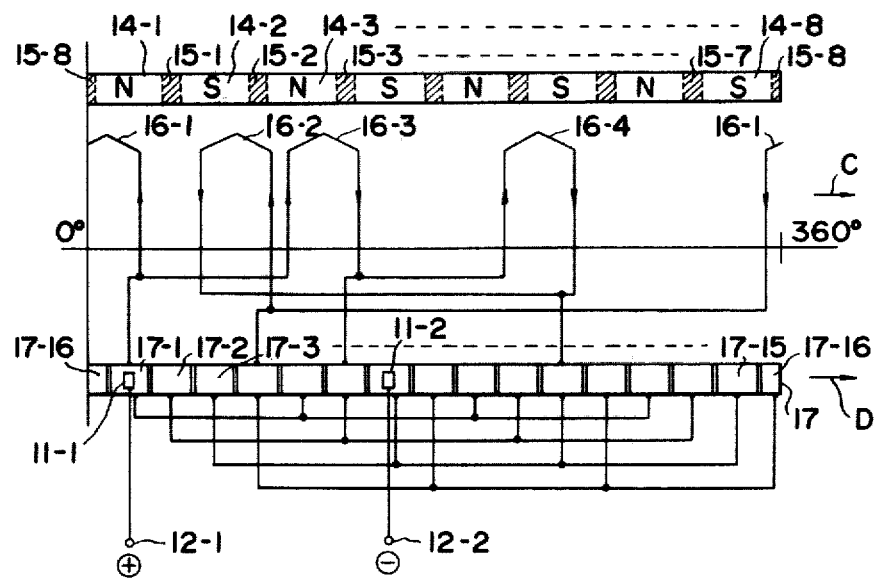
FIGS. 3, 4, 5, 6 and 7 are developed views illustrating, respectively, various other embodiments of field magnets and armatures.

FIG. 3 illustrates the development of a motor in accordance with the present invention where m=2 and n=2, i.e., there are eight field magnet poles and four armature windings. In FIG. 3, a field magnet comprises magnetic poles 14-1, 14-2, . . . , 14-8 which are magnetized alternately into N and S polarity and subtend angular spaces of about 36° and are spaced alternately with sections 15-1, 15-2, . . . , 15-8 which subtend an angular space of about 9° each and which contain either a weak magnetic field or no magnetic field. A commutator 17 comprises commutator segments 17-1, 17-2, . . . , 17-16, each subtending an angular space of 22.5°. The commutator segments 17-1, 17-5, 17-9, 17-13 are interconnected in common through a lead wire and similarly, the commutator segments 17-2, 17-6, 17-10, and 17-14; the segments 17-3, 17-7, 17-11, and 17-15; and the segments 17-4, 17-8, 17-12, and 17-16 are interconnected in common through corresponding lead wires, respectively. The armature windings 16-1, 16-2, 16-3, 16-4 are arranged in the manner shown in FIG. 3 as follows: the armature windings 16-1 and 16-2 are disposed at 67.5° angular spacing; the windings 16-2 and 16-3 at a 45° angular spacing; the windings 16-3 and 16-4 at a 112.5° angular spacing; and the windings 16-4 and 16-1 at a 135° angular spacing; all of the armature windings being arranged in a non-superposed fashion with respect to each other, to constitute the armature. The angular spacing between those conductor portions of the armature winding that contribute to the generation of torque is about 36° and is equal to the angular width or space of each of the field magnet poles 14-1, 14-2, . . . , 14-8. The respective between the armature windings 16-1 and 16-3, between the windings 16-3 and 16-4, between the windings 16-4 and 16-2, and between the windings 16-2 and 16-1 are connected respectively to the commutator segments 17-1, 17-6, 17-11, and 17-4. The angular spacing between the brushes 11-1 and 11-2 is 135°, while any other spacing value of 45° (360°/l(2m+2n) wherein l=1, m=2, n=2), 225° or 315° may be employed as an equivalent in principle of the value of 135°. With the relative position of the field magnet poles and the armature windings as shown in FIG. 3, the current flows in the directions indicated by the arrows to generate torque at the respective armature windings, to drive the armature and cause the armature and the commutator 17 to rotate respectively, in the directions of arrows C and D. With continued rotation of the commutator 17, current flowing through the armature windings will change in direction and in sequence in a similar manner as described alone in connection with FIG. 2, causing the armature and the commutator to continue rotating.

Figure 4:
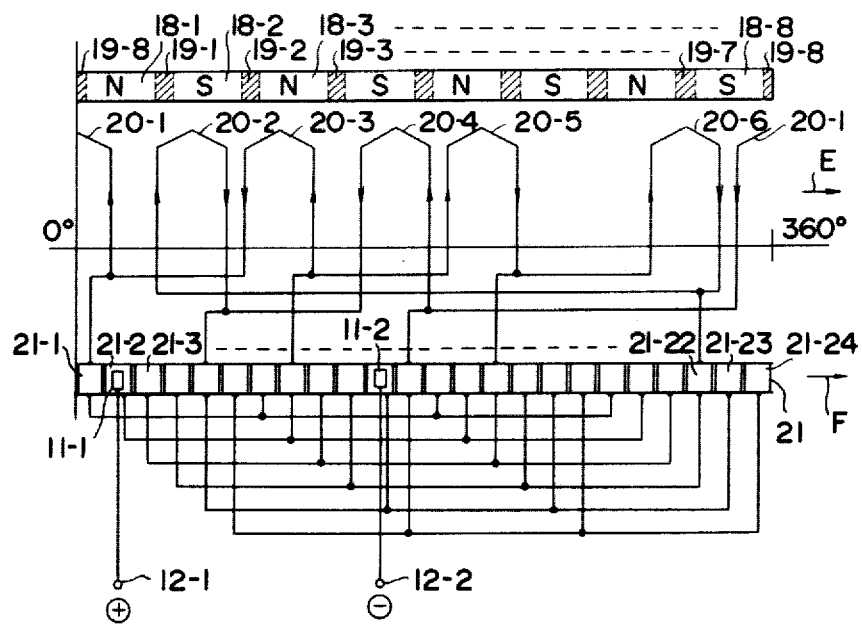

FIG. 4 illustrates the development of still another motor embodiment in accordance with the present invention in which m=1 and n=3, i.e., these are eight field magnet poles and six armature windings. In FIG. 4, the field magnet comprises magnetic poles 18-1, 18-2, . . . , 18-8 which are magnetized alternately into N and S polarities subtending angular spaces of about 36° and are spaced alternately with sections 19-1, 19-2, . . . , 19-8 which subtend an angular space of about 9° each and to contain either a weak magnetic field or no magnetic field. A commutator 21 comprises commutator segments 21-1, 21-2, . . . , 21-24, each subtending an angular space of 15°. The commutator segments 21-1, 21-7, 21-13, 21-19 are interconnected in common through a lead wire, and similarly, the commutator segments 21-2, 21-8, 21-14, and 21-20; the segments 21-3, 21-9, 21-15, and 21-21; the segments 21-4, 21-10, 21-16, and 21-22, the segments 21-5, 21-11, 21-17, and 21-23; and the segments 21-6, 21-12, 21-18, and 21-24 are interconnected in common through corresponding lead wires, respectively. Armature windings 20-1, 20-2, . . . , 20-6 are arranged in the manner shown in FIG. 4 as follows: the armature windings 20-1 and 20-2, and the windings 20-3 and 20-4 are disposed at a 60° angular spacing respectively; the windings 20-2 and 20-3, the windings 20-4 and 20-5, and the windings 20-6 and 20-1 at a 45° angular spacing, respectively; and the windings 20-5 and 20-6 at a 105° angular spacing, all of the armature windings being arranged in a non-superposed fashion with respect to each other to thereby constitute the armature. The angular spacing between those conductor portions of the armature windings that contribute to the generation of torque is about 36° which is equal to the angular width or space of each of the field magnet poles 18-1, 18-2, . . . , 18-8. The respective junctions between the armature windings 20-1 and 20-3, between the windings 20-3 and 20-5, between the windings 20-5 and 20-6, between the windings 20-6 and 20-2, between the windings 20-2 and 20-4, and between the windings 20-4 and 20-1 are connected respectively to the commutator segments 21-1, 21-8, 21-15, 21-22, 21-5, and 21-12. The angular spacing between the brushes 11-1 and 11-2 is 135°, and any other spacing value of 45° (360°/l(2m+2n) wherein l=1, m=1, n=3), 225° or 315° may be employed as an equivalent, in principle of the value of 135°. In the relative position of the field magnet poles and the armature windings as shown in FIG. 4 current flows in the directions indicated by the arrows to generate torque at the respective armature windings, to drive the armature and cause the armature and the commutator 21 respectively to rotate in the directions of arrows E and F. With continued rotation of the commutator 21, the current flowing through the armature windings will change in direction and in sequence, and cause the armature and the commutator to continue rotation.

Figure 5:
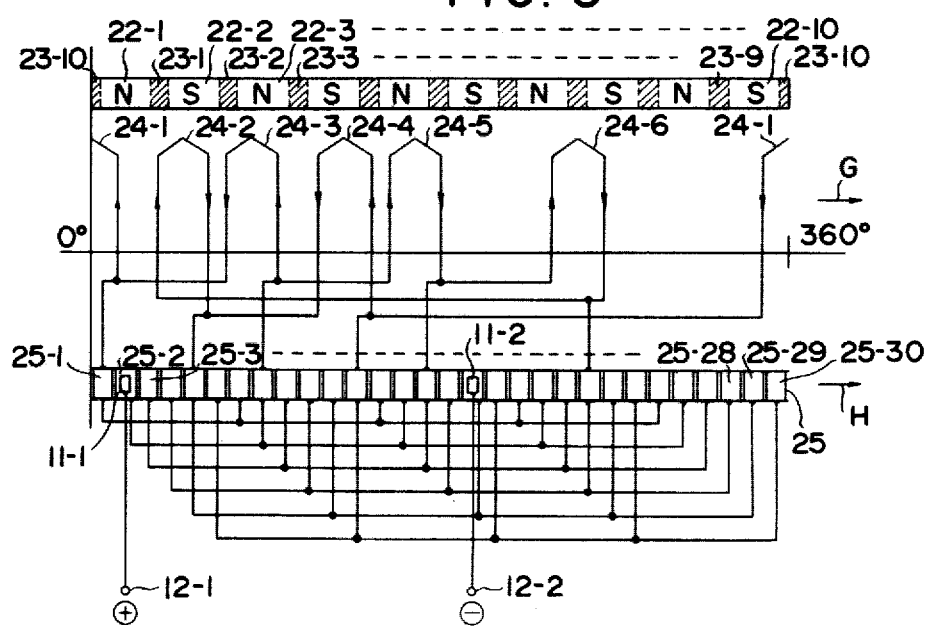

FIG. 5 illustrates the development of still another motor embodiment with the present invention in which m=2 and n=3, i.e., there are 10 field magnet poles and six armature windings. In FIG. 5, field magnet comprises magnetic poles 22-1, 22-2, . . . , 22-10 which are magnetized alternately into N and S polarity and subtend angular spaces of about 27° and are spaced alternately with sections 23-1, 23-2, . . . , 23-10 which subtend an angular space of about 9° each and contain either a weak magnetic field or no magnetic field. The commutator 25 comprises commutator segments 25-1, 25-2, . . . , 25-30, each subtending an angular space of 12°. The commutator segments 25-1, 25-7, 25-13, 25-19, and 25-25 are interconnected in common through a lead wire, and similarly, the commutator segments 25-2, 25-8, 25-14, 25-20, and 25-26; the segments 25-3, 25-9, 25-15, 25-21, and 25-27; the segments 25-4, 25-10, 25-16, 25-22, and 25-28; the segments 25-5, 25-11, 25-17, 25-23, and 25-29; and the segments 25-6, 25-12, 25-18, 25-24, and 25-30 are interconnected in common through corresponding lead wires, respectively. Armature windings 24-1, 24-2, . . . , 24-6 are arranged in the manner shown in FIG. 5 as follows: the armature windings 24-1 and 24-2, and the windings 24-3 and 24-4 are disposed at a 48° angular spacing, respectively; the windings 24-2 and 24-3, and the windings 24-4 and 24-5 at a 36° angular spacing, respectively; the windings 24-5 and 24-6 at a 84° angular spacing; and the windings 24-6 and 24-1 at a 108° angular spacing; all of the armature windings being arranged in a non-superposed manner with respect to each other, to constitute the armature. The angular spacing between those conductor portions of the armature winding that contribute to the generation of torque is about 27° which is equal to the angular width or space of each of the field magnet poles 22-1, 22-2, . . . , 22-10. The respective junctions between the armature windings 24-1 and 24-3, between the windings 24-3 and 24-5, between the windings 24-5 and 24-6, between the windings 24-6 and 24-2, between the windings 24-2 and 24-4, and between the windings 24-4 and 24-1 are connected respectively to the commutator segments 25-1, 25-8, 25-15, 25-22, 25-5, and 25-12. The angular spacing between the brushes 11-1 and 11-2 is 180°, and any other spacing value of 36° (360°/l(2m+2n) wherein l=1, m=2, n=3), 108°, 252° or 324° may be employed as an equivalent, in principle, of spacing value of 180°. In the relative position of the field magnet poles and the armature windings shown in FIG. 5, the current flows in the directions indicated by the arrows to generate torque at the respective armature windings, to drive the armature and the commutator 25, respectively, in the directions of arrows G and H. With additional rotation of the commutator 25, current flowing through the armature windings will change in direction and in sequence, and cause the armature and the commutator to continue to rotate.

Figure 6:
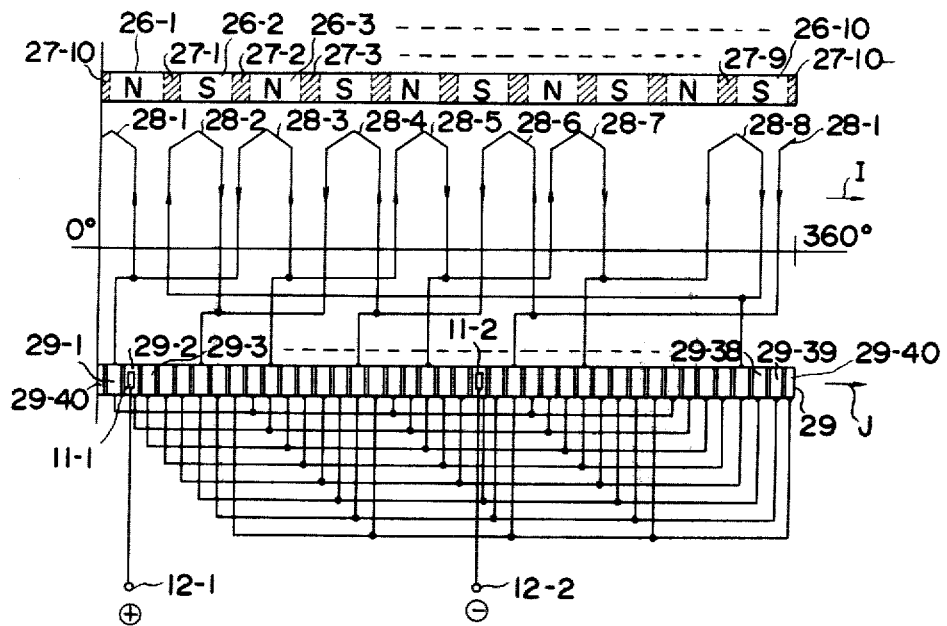

FIG. 6 illustrates the development of a still another motor embodiment in accordance with the present invention in which m=1 and n=4, i.e., there are ten field magnet poles and eight armature windings. In FIG. 6, the field magnet comprises magnetic poles 26-1, 26-2, ..., 26-10 which are magnetized alternately into N and S polarity subtending angular spaces of about 27° and are spaced alternately with sections 27-1, 27-2, ..., 27-10 which subtend an angular space of about 9° each and contain either a weak magnetic field or no magnetic field. A commutator 29 comprises commutator segments 29-1, 29-2, ..., 29-40, each subtending an angular space of 9°. The commutator segments 29-1, 29-9, 29-17, 29-25, and 29-33 are interconnected in common through a lead wire, and similarly, the commutator segments 29-2, 29-10, 29-18, 29-26, and 29-34; the segments 29-3, 29-11, 29-19, 29-27, and 29-35; the segments 29-4, 29-12, 29-20, 29-28, and 29-36; the segments 29-5, 29-13, 29-21, 29-29, and 29-37; the segments 29-6, 29-14, 29-22, 29-30, and 29-38; the segments 29-7, 29-15, 29-23, 29-31, and 29-39; and the segments 29-8, 29-16, 29-24, 29-32, and 29-40 are interconnected in common through corresponding lead wires, respectively. Armature windings 28-1, 28-2, ..., 28-8 are arranged in the manner shown in FIG. 6 as follows: the armature windings 28-1 and 28-2, the windings 28-3 and 28-4, and the windings 28-5 and 28-6 are disposed at a 45° angular spacing, respectively; the windings 28-2 and 28-3, the windings 28-4 and 28-5, the windings 28-6 and 28-7, and the windings 28-8 and 28-1 at a 36° angular spacing, respectively; and the windings 28-7 and 28-8 at a 81° angular spacing; all of the armature windings being arranged in a non-superposed fashion with respect to each other to constitute the armature. The angular spacing between those conductor portions of the armature winding that contribute to the generation of torque is about 27° which is equal to the angular width or space of each of the field magnet poles 26-1, 26-2, ..., 26-10. The respective junctions between the armature windings 28-1 and 28-3, between the windings 28-3 and 28-5, between the windings 28-5 and 28-7, between the windings 28-7 and 28-8, between the windings 28-8 and 28-2, between the windings 28-2 and 28-4, between the windings 28-4 and 28-6, and between the windings 28-6 and 28-1 are connected to the commutator segments 29-1, 29-10, 29-19, 29-28, 29-37, 29-6, 29-15, and 29-24, respectively. The angular spacing between the brushes 11-1 and 11-2 is 180°, and any other spacing value of 36° (360°/l(2m+2n) wherein l=1, m=1, n=4), 108°, 252° or 324° may be employed as an equivalent in principle of the value of 180°. In the relative position of the field magnet poles and the armature windings as shown in FIG. 6, the current flows in the directions illustrated by the arrows to generate torque at the respective armature windings, to drive the armature and the commutator 29 respectively in the directions of arrows I and J. With additional rotation of the commutator 29, the current flowing through the armature windings will change in direction and in sequence, causing the armature and the commutator to rotate continuously.

Figure 7:
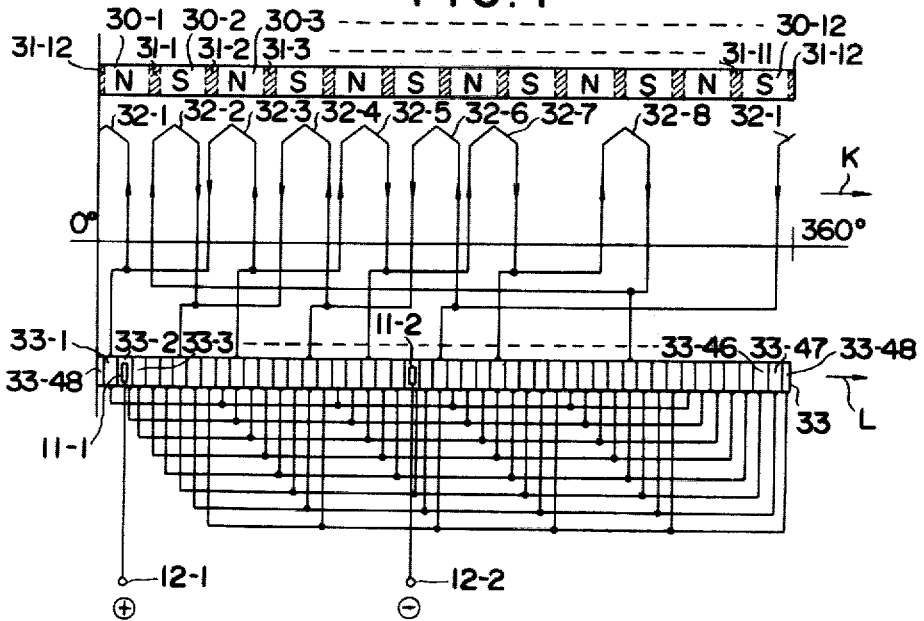

FIG. 7 illustrates the development of a still another motor embodiment in accordance with the present invention in which m32 2 and n=4, i.e., there are 12 field magnet poles and light armature windings. In FIG. 7, the field magnet comprises magnetic poles 30-1, 30-2, ..., 30-12 which are magnetized alternately into N and S polarity and subtend angular spaces of about 24° and are spaced alternately with sections 31-1, 31-2, ..., 31-12 which subtend an angular space of about 6° each and to contain either a weak magnetic field or no magnetic field. Commutator 33 comprises commutator segments 33-1, 33-2, ..., 33-48, each subtending an angular space of 7.5°. The commutator segments 33-1, 33-9, 33-17, 33-25, 33-33, 33-41 are interconnected in common through a lead wire, and similarly, the commutator segments 33-2, 33-10, 33-18, 33-26, 33-34, and 33-42; the segments 33-3, 33-11, 33-19, 33-27, 33-35, and 33-43; the segments 33-4, 33-12, 33-20, 33-28, 33-36, and 33-44; the segments 33-5, 33-13, 33-21, 33-29, 33-37, and 33-45; the segments 33-6, 33-14, 33-22, 33-30, 33-38, and 33-46; the segments 33-7, 33-15, 33-23, 33-31, 33-39, and 33-47; and the segments 33-8, 33-16, 33-24, 33-32, 33-40, and 33-48 are interconnected in common through corresponding lead wires, respectively. The armature windings 32-1, 32-2, ..., 32-8 are arranged in the manner shown in FIG. 7 as follows: the armature windings 32-1 and 32-2, the windings 32-3 and 32-4, and the windings 32-5 and 32-6 are disposed at a 37.5° angular spacing, respectively; the windings 32-2 and 32-3, the windings 32-4 and 32-5, and the windings 32-6 and 32-7 at a 30° angular spacing, respectively; the windings 32-7 and 32-8 at a 67.5° angular spacing; and the windings 32-8 and 32-1 at a 90° angular spacing; all the armature windings being arranged in a non-superposed fashion with respect to each other, to constitute the armature. The angular spacing between those conductor portions of the armature winding that contribute to the generation of torque is about 24° which is equal to the angular width or space of each of the field magnet poles 30-1, 30-2, ..., 30-12. The respective junctions between the armature windings 32-1 and 32-3, between the windings 32-3 and 32-5, between the windings 32-5 and 32-7, between the windings 32-7 and 32-8, between the windings 32-8 and 32-2, between the windings 32-2 and 32-4, between the windings 32-4 and 32-6, and between the windings 32-6 and 32-1 are connected to the commutator segments 33-1, 33-10, 33-19, 33-28, 33-37, 33-6, 33-15, and 33-24, respectively. The angular spacing between the brushes 11-1 and 11-2 is 150°, and any other value of 30° (360°/l(2m+2n) wherein l=1, m=2, n=4), 90°, 210°, 270°, or 330° may be employed as an equivalent, in principle of the value of 150°. In the relative position of the field magnet poles and the armature windings as shown in FIG. 7, the current flows in the directions indicated by the arrows to generate torque at the respective armature windings, to drive the armature and the commutator 33 respectively in the directions of arrows of K and L. With additional rotation of the commutator 33, the current flowing through the armature windings will change in direction and in sequence, and cause the armature and the commutator to rotate continuously.

While, in the above-described embodiments, motors have been described where the number of the field magnet poles is (2m+2n) (m being a positive integer of 1 or more and n being a positive integer of 2 or more) and the number of the armature windings is 2n, the invention can be applied also to the case where the number of field magnet poles is l(am+2n) (l being a positive integer of 1 or more) and the number of armature windings is 2ln (l being a positive integer of 1 or more), with the armature windings being arranged, in a non-superposed fashion with respect to each other, on a face of the armature.

Thus, there is provided in accordance with the invention a DC motor which has the advantage discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. A direct current motor having armature windings that are non-superposed with respect to each other comprising:
   a field magnet having l(2m+2n) poles that are magnetized into alternate N and S polarities in equal angular spaces wherein l and m are positive integers of 1 or more and n is a positive integer of 2 or more;
   a magnetic material member for closing the magnetic path of said field magnet; and
   an armature having 2ln armature windings disposed thereon within said magnetic path in a non-superposed manner with respect to each other and in a face-to-face relationship with respect to said field magnet poles, said windings each being formed such that the angular spacing of those conductor portions thereof that contribute to the generation of torque is equal to the angular width of a field magnet pole.

2. A direct current motor according to claim 1 wherein terminals of said 2ln armature windings are connected to corresponding ones of 2ln(m+n) commutator segments which are interconnected in common l(m+n) by l(m+n), further including brushes in sliding contact with said commutator segments for supplying current to said armature windings from a positive and negative terminals of a direct current supply source, and said brushes, which contact respectively with ones of said commutator segments, are angularly spaced from each other by 360°/l(2m+2n) or by an angle between the commutator segments which are interconnected respectively in common with said ones of the commutator segments.

* * * * *